United States Patent

Eley et al.

[11] 3,935,917
[45] Feb. 3, 1976

[54] HYDRAULIC PUMP CONTROL SYSTEM

[75] Inventors: James M. Eley; Arthur B. Joyce, both of Corinth, Miss.

[73] Assignee: Tyrone Hydraulics, Inc., Corinth, Miss.

[22] Filed: Oct. 18, 1974

[21] Appl. No.: 515,990

[52] U.S. Cl............. 180/53 R; 180/79.2 R; 60/405
[51] Int. Cl.² ......................................... B62D 5/08
[58] Field of Search........ 180/79.2 R, 53 R; 60/405, 60/404; 417/253, 295

[56] References Cited
UNITED STATES PATENTS

| | | | |
|---|---|---|---|
| 3,280,557 | 10/1966 | Sattavara | 180/79.2 R X |
| 3,407,894 | 10/1968 | Thompson | 180/53 R |
| 3,424,262 | 1/1969 | Kunz | 180/79.2 R |
| 3,434,282 | 3/1969 | Shelhart | 60/405 |
| 3,696,613 | 10/1972 | Goodale | 60/404 |
| 3,747,725 | 7/1973 | Feustel | 180/79.2 R |

Primary Examiner—M. Henson Wood, Jr.
Assistant Examiner—Terrance L. Siemens
Attorney, Agent, or Firm—Synnestvedt & Lechner

[57] ABSTRACT

The disclosure relates to a control system for hydraulic pumps driven by the engine of a vehicle or the like and used for operating an auxiliary mechanism such as a vehicle mounted implement, a power steering system or the like. The disclosed system includes means for interrupting the flow of operating fluid to the pump during periods of time when the output of the pump is not required. With the pump inlet closed, all of the hydraulic fluid on the suction side is immediately pumped out the pump discharge, leaving only a small amount of residual oil on the surface of the working parts to provide lubrication. A valve is provided to prevent fluid from returning to the pump because of downstream pressure in the circuit. Control means, utilizing pressure downstream from the pump, for operating the valve in the inlet of the pump are disclosed.

10 Claims, 4 Drawing Figures

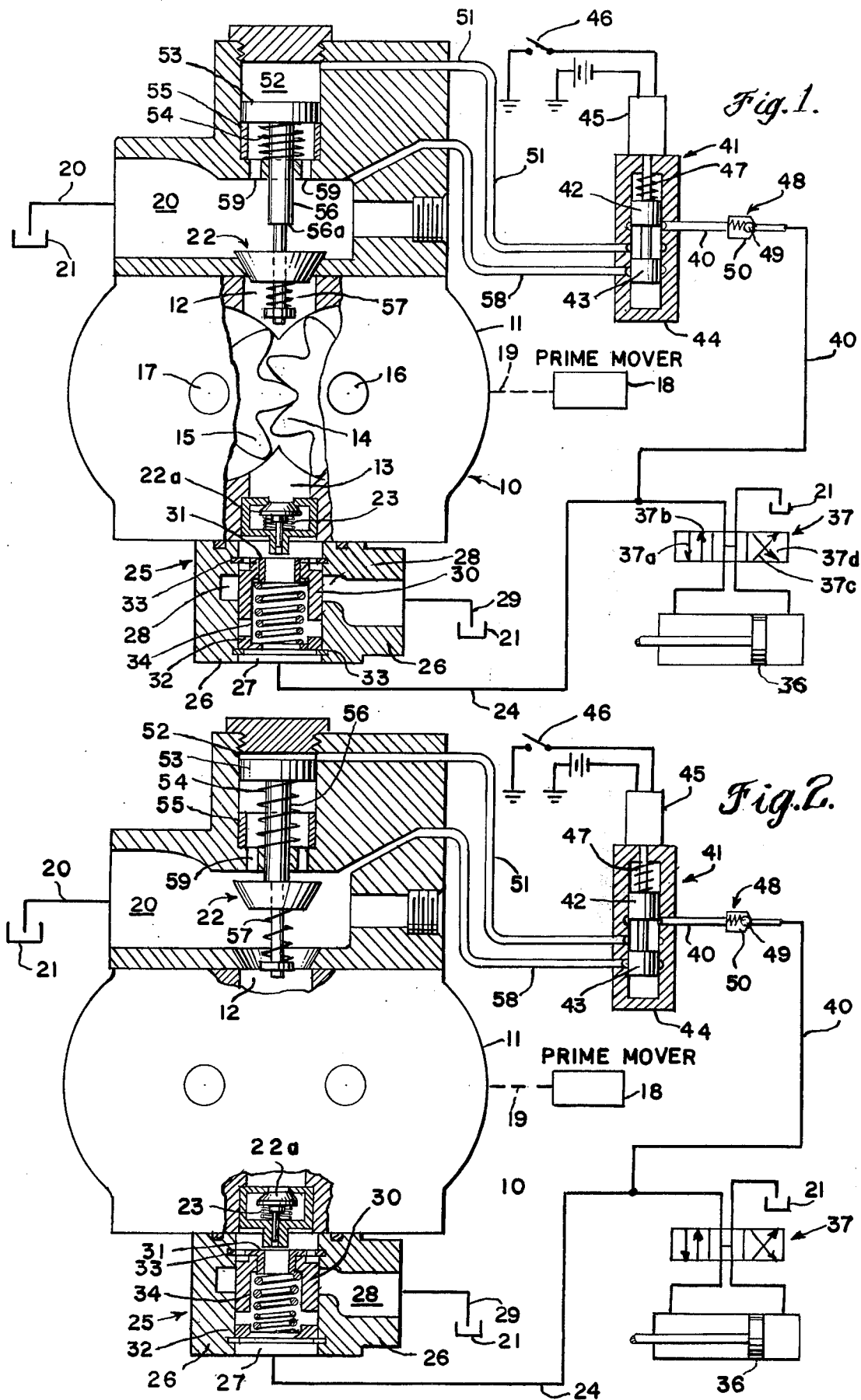

HYDRAULIC PUMP CONTROL SYSTEM

FIELD OF THE INVENTION

The invention relates to a hydraulic control system for fixed displacement hydraulic pumps and valve means for removing the pump from a hydraulic circuit when not required. More particularly, the invention provides for the interruption of the supply of hydraulic operating fluid to the pump so that when the pump is not required for the operation of auxiliary equipment, the pump runs in the absence of fluid, thereby consuming very little power and operating with minimal noise.

BACKGROUND OF THE INVENTION AND PRIOR ART

Examples of applications of the invention are found in hydraulically operated implement systems for earth moving equipment, in hydraulic systems for hydraulically operated dump truck mounted dumping mechanisms, packing mechanisms in refuse collection equipment and in auxiliary hydraulic systems for power steering units, brake systems and the like.

The invention provides a solution to the problems of noise and power loss in equipment of the kind described above. In such equipment it is customary and desirable practice that the hydraulic pumps for operating auxiliary equipment be driven by the same engine which provides the motive power for the vehicle. In many of the applications for such equipment, ample power is available for the hydraulic pump, because the requirements for use of the pump usually don't coincide with the requirements on the engine for driving the vehicle from place to place.

At typical vehicle running speeds however, unless means are provided for disengaging the pump from the engine, considerable engine horsepower is used by the pump in circulating hydraulic fluid through the hydraulic system. This wastes power and hence fuel and is a significant source of hydraulic noise since the noise level in hydraulic systems increases directly with pump speed.

As a means for solving the noise problem, it is known to use a large pump having sufficient capacity to operate the auxiliary equipment when the pump is operated at or near the idling speed of the vehicle engine. A clutch is provided so that when the vehicle is in motion, the operator can disengage the pump. According to one known solution employing a large capacity pump, a centrifugal clutch is used to disengage the pump at high running speeds where noise becomes objectionable. In addition, it is known to use multiple pumps and to divert part of the output of the pumps back to the fluid reservoir in the event of particular upper flow rates or pressure values as a means of minimizing noise.

SUMMARY AND OBJECTS OF THE INVENTION

According to the invention, a system is provided which facilitates use of a large displacement pump of the fixed displacement type for operation of auxiliary equipment in a vehicle. The pump is driven by the prime mover of a vehicle and is capable of accomplishing its function in the lower range of operating speeds of the engine. In carrying out the invention, control means are provided including a valve in the pump suction for interrupting the fluid supply so that the pump simply runs as a gearbox at times when the pump is not needed, between work sites as for example when the vehicle is running at high speeds. At such times, minimal power is required to operate the pump since no fluid is being pumped. The need for a clutch to disengage the pump from the prime mover is eliminated. Preferably means are provided on the discharge side of the pump for preventing fluid from flowing back into the pump in the event of high downstream pressure in the circuit.

With the foregoing in view, an important object of the invention is the provision of a hydraulic control system for engine driven hydraulic pumps which is simple in design and leads to more efficient operation.

Another object of the invention is the provision, in a hydraulic control system for an engine driven hydraulic pump, of means for reducing fuel consumption when the hydraulic system is not in use.

Still another important object of the invention is the provision of an improved hydraulic control system for engine driven hydraulic pumps which leads to quieter overall operation of the hydraulic system than is possible when the pump is continuously running.

Still another object of the invention is the provision of a simplified hydraulic system for cutting out a hydraulic pump from the system when not in use.

Turning now to the detailed description of the embodiments of the invention, reference is made to the accompanying drawings in which:

FIG. 1 is a view illustrating a gear hydraulic control system incorporating the principles of the invention;

FIG. 2 is a view of the system shown in FIG. 1, with the parts being shown in which the pump is activated;

Figure 3:
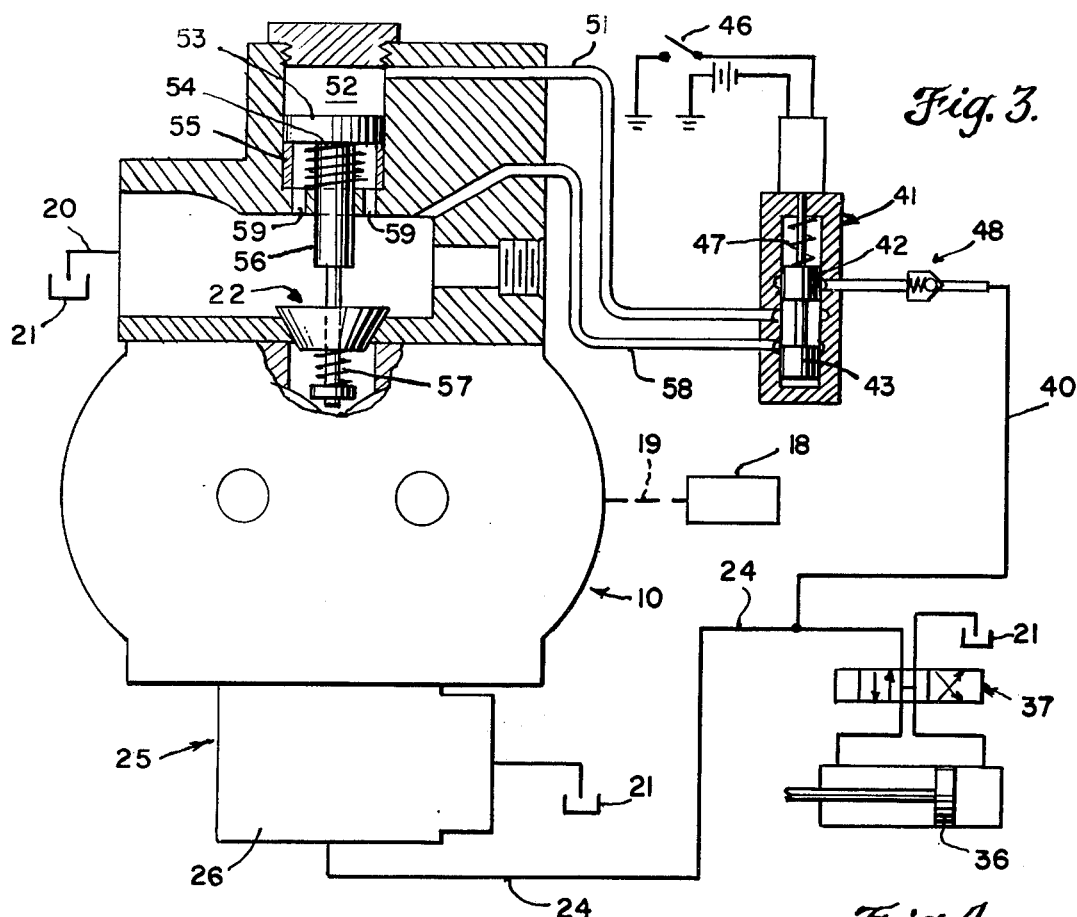
FIG. 3 is still another view of the system of FIG. 1 with control valve parts in position to effect reactivation of the pump.

Turning to FIG. 1, the pump means preferably comprises a fixed displacement gear pump 10. Pump 10 is comprised of a housing 11, a suction or inlet cavity 12 and a discharge cavity 13. Fluid is drawn from suction and discharged under pressure by means of gears 14 and 15, which are mounted on shafts 16 and 17 respectively. The shafts are mounted for rotation within the cavity formed by the walls of the housing 11, with the gear teeth providing for the pumping of hydraulic fluid from the suction or inlet passageway through the housing to the discharge 13. The pump is driven by a drive means which in the illustrative embodiment of the invention comprises the vehicle prime mover or engine schematically represented at 18. A drive shaft schematically shown by the broken line 19 interconnects the engine to shaft 16.

An inlet line 20 leads from reservoir 21 and provides for a supply of operating fluid for the hydraulic system. A first valve means, preferably in the form of a plug valve 22, described in more detail hereinafter, is provided in the inlet line at the opening into suction 12.

A second valve means comprising a check valve 22a is located in the pump discharge. Check valve 22a is spring loaded to the closed position to insure that flow of fluid back to the pump is prevented in the event of high downstream pressure. Pump pressure produced when the pump is in operation, causes spring 23 to be compressed, thereby opening the valve and permitting the flow of fluid to discharge line 24.

In the illustrative embodiment of the invention, flow regulator means comprising a flow regulator or priority valve 25 is located in the pump discharge line downstream from the check valve 22a. In its preferred form, flow regulator valve 25 comprises a housing 26 having primary passageway 27 permitting the flow of fluid to the discharge line 24. A second passageway 28 branches from passageway 27 and provides communication with the reservoir, via a line schematically represented at 29.

The flow regulator valve further includes a spool 30 in which is secured an orifice plug 31. The spool is mounted for movement within the housing 26 between a first position shown in the drawing and a second position in which it abuts against a retainer 32 which is positioned by a snap ring 33. A spring 34 urges the spool to the first position. In this position, secondary passage 28 is blocked and fluid from the pump is directed through the primary passage 27. As the rate of flow through the orifice in plug 31 increases, a set point will be reached at which the differential pressure across the orifice causes the spool to shift to the second position. As passageway 28 is uncovered, fluid in excess of a particular value is diverted to the reservoir via the secondary passageway 28 and the line 29.

Pump discharge line 24 leads to an implement or other hydraulically operated auxiliary device schematically represented by the piston 36 via a valve 37. Valve 37 is also shown schematically and is a three position valve of known construction. As is shown, the valve is in an intermediate position in which all ports are connected together and fluid is diverted to the reservoir. In one extreme position of the valve 37, valve passageways 37a and 37b provide for moving the implement in one direction whereas in the other extreme position, ports 37c and 37d provide for movement of the implement in the opposite direction.

In either of the extreme positions, fluid flow from the pump moves the piston in a given direction, displacing fluid on the opposite side thereof through valve 37 to the reservoir 21.

According to one aspect of the invention, means are provided for operating the first valve means utilizing the pressure provided by the pump means. This is done in the embodiments of FIGS. 1–3 by means including a line 40, which leads from the discharge line 24 to a pilot valve schematically represented at 41.

In the embodiment of FIGS. 1–3, pilot valve 41 comprises a pair of interconnected spools 42 and 43 which are adapted to be shifted within a housing 44 by actuating means such as a solenoid 45 which may be selectively actuated, for instance by operation of a switch 46, located at a suitable place within the vehicle. A spring 47 urges the spools to the position illustrated in FIG. 3.

A check valve 48 is located in the line 40. Check valve 48 is of known construction and comprises a valve member 49, spring loaded by means of a spring 50 so as to permit the flow of fluid via the line 40 to the pilot valve while preventing the reverse flow of such fluid back through line 40. An inlet to the pilot valve housing is provided when the spools 42 and 43 are in the position shown in FIG. 1. In this position, flow is permitted through the pilot valve through a line 51 to a cavity 52 which is located adjacent the pump inlet passageway. A piston 53 is slidably mounted within the cavity 52. A spring 54 biases the piston 53 to the raised position. A spacer sleeve 55 limits the downward movement of the piston as the parts are illustrated in FIG. 1.

As mentioned above, the first valve means comprises a plug member 22 which is slidably mounted on a reduced end of a rod 56 which extends downwardly from the piston 53. A spring 57 biases the plug valve member 22 to a raised position shown in FIG. 2. The rod 56 is stepped as shown at 56a and in FIG. 2 the plug valve 22 is shown against the step 56a under the urging of spring 57.

A line 58 leading from the pilot valve housing is connected to supply passage 20 and provides for communication between the pilot valve and the underside of the piston 53, via the supply passageways 59. When the pilot valve is in the position shown in FIG. 1 in which the pump is deactivated, passageway 58 is blocked. Movement of the pilot valve under action of spring 47 establishes communication between the line 51 and the line 58.

In operation of the control system so far described, assume first that the pump is operating and that fluid is supplied through the inlet passageway 20 through discharge line 24 and valve 37 to move piston 36 towards one of its limits of travel. Assume now that the solenoid 45 is energized by closure of the switch 46 so that the solenoid operated valve spools 42 and 43 are raised to the position shown in FIGS. 1 and 2. When this occurs, fluid flows through line 40 through the check valve 48 out through line 51 to the cavity 52. Check valve 48 prevents the fluid supplied from flowing back through line 40. The pressure causes the assembly comprising piston 53 and rod 56 to start to move the first valve means comprising plug valve 22 towards pump suction. As plug valve 22 approaches the inlet of the pump a vacuum is created in the cavity 10 causing the plug valve to seat tightly, completely stopping the flow of fluid to the pump. This is the position of the parts shown in FIG. 1. The vacuum in suction cavity 12 maintains the plug valve 22 in the position shown in FIG. 1, thereby preventing the entry of any additional fluid. The fluid that was in the pump cavity when the plug valve closed is discharged through check valve 22a.

It is pointed out that spring 54 urges piston 3 from the position shown in FIG. 1 to the position shown in FIG. 2 but is prevented from doing so when the spools are in the position shown in FIGS. 1 and 2 because of the operation of check valve 48 in preventing the flow of fluid in line 51 back through line 40. The pump gears 14 and 15 continue to turn in a void and are lubricated by the fluid which remains on the walls of the housing 11. Since the gears are not pumping any fluid, only enough power is required to overcome frictional forces, with the result that very little horsepower is used in driving the pump at vehicle operating speeds and very little heat is generated.

FIG. 3 shows the pilot valve 41 in the position in which the pump is reactivated. In this position, the spools 42 and 43 are shifted into position in which lines 51 and 58 are in communication. Since the supply line 20 is at low pressure, the pressure in cavity 52 drops and the spring 54 pushes the piston 53 upwardly, expelling the fluid in cavity 52 via the lines 51 and 58 back to pump suction. As the piston 53 returns to the position of FIG. 2, plug valve 22 is retracted from the inlet of the pump and the vacuum in cavity 12 is broken. With the reduction in vacuum, spring 57 pushes the plug valve 22 up against the shoulder 56a and free flow into the pump inlet is again established.

Figure 4:
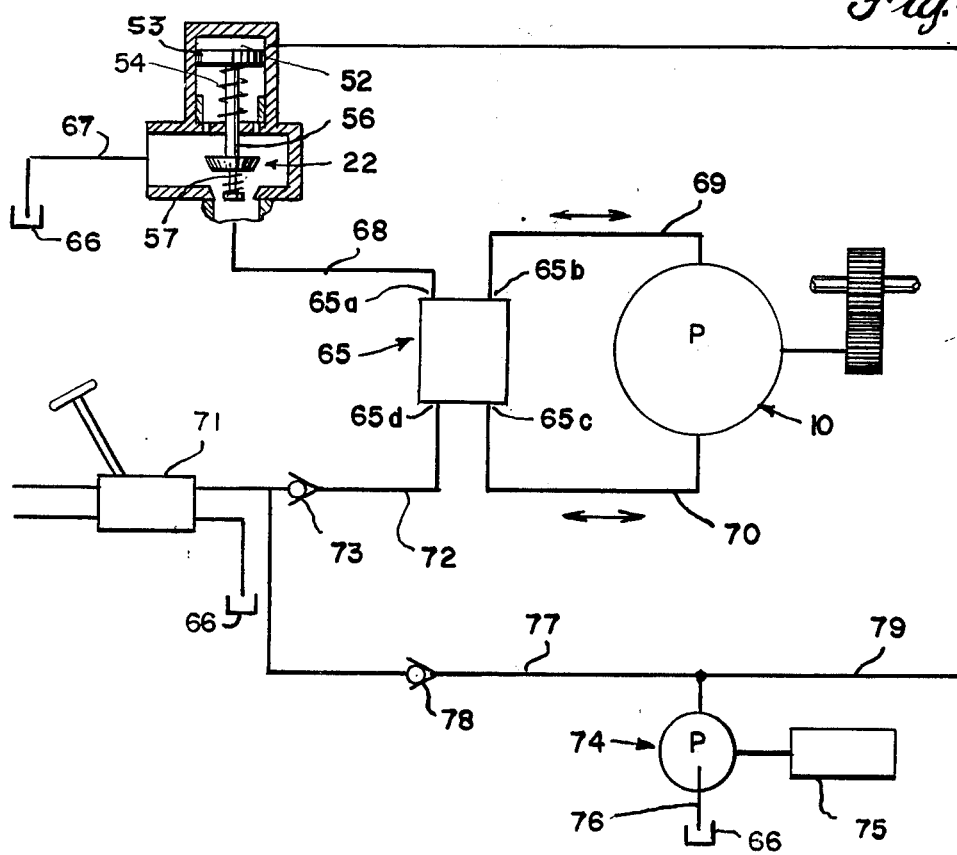
FIG. 4 is a schematic rendering of a vehicle steering system incorporating principles of the present invention.

FIG. 4 is a view showing an embodiment of the invention providing an auxiliary power source in a steering control system of the kind disclosed in Joyce U.S. Pat. No. 3,631,937 owned by the assignee of this application. In FIG. 4, pump 10 is an auxiliary pump which is preferably of the gear type and connected to a part of the drive train of the vehicle, being connected for example to the rear wheels, so that the pump is driven whenever the vehicle is in motion.

A reversing valve 65 of the kind shown in U.S. Pat. No. 3,631,937 is preferably provided for controlling fluid flow to and from the pump. Valve 65 has first inlet port 65a through which fluid is received from a sump or reservoir 66 via line 67a, valve 22 and a line 68. A second port 65b is connected to one port of pump 10 via a line 69. A third valve port 65c connects with the other port of pump 10 via a line 70. The valve is also provided with an outlet port 65d. Port 65d leads to a vehicle steering valve 71 via a line 72. Check valve 73 prevents the return of fluid through line 72 to the valve 65. Valve 65 operates to deliver fluid from port 65a to port 65b or port 65c, depending upon the direction of rotation of pump 10. Thus, if pump 10 is operated so that line 69 is the suction side of the pump, fluid will flow from line 68, through port 65a, out through port 65b to line 65b. Fluid discharged from pump 10 flows through line 70, through port 65c, out through port 65d to line 72. If the pump is operated in the reverse sense, fluid flows to the pump from valve port 65c and returns from the pump through port 65b which connects to port 65d and to line 72.

A pump 74 driven by vehicle engine 75 provides power for the hydraulic steering system as required when the engine is in operation. The pump 74 is in a circuit including reservoir 66, a pump inlet line 76 and outlet line 77, which ordinarily provides fluid under pressure to the steering system via valve 71. A check valve 78 in the line 77 prevents fluid from returning to the inlet of pump 74. A line 79 leads from the outlet of pump 74 to piston 52 which controls valve 22. As in the embodiment of FIGS. 1–3, piston 52 is biased to the raised position by means of a spring 54. Valve 22 is mounted on the reduced diameter portion of rod 56 which extends downwardly from the piston. Spring 56 urges the valve member 22 to the raised position against the shoulder on the rod 56.

Under conditions of normal operation when the vehicle engine 75 is running, pump 74 provides operating fluid through the valve 71 of the steering system to hydraulic steering rams, not shown. So long as the pump 74 is in operation, fluid is also delivered through line 79 to the upper side of piston 52. Due to the pressurized fluid, piston 52 is moved downwardly to a position in which valve 22 is closed and flow is blocked from the line 67 through 68. Since pump 10 is in operation whenever the vehicle is in motion, there is a suction in line 68 which draws the plug 22 tightly into its seat.

In the event of engine failure at a time when the vehicle is in motion, pressure in line 79 drops as soon as the pump 74 stops operating. This permits piston 52a to rise under the urging of spring 54a and the line 67 is connected with the line 68. This permits the flow of fluid to the inlet of pump 10 and fluid is pumped through valve outlet port 65d, through line 72 to the power steering system 71.

The embodiment of the invention disclosed in FIG. 4 insures that the power steering system will always be supplied with fluid under pressure whenever the vehicle is in motion. An important advantage of the invention is the fact that the pump 10 does not use appreciable vehicle horsepower, since the supply of fluid for the pump is interrupted at all times when the pump 74 is pumping fluid. If the entire engine stops and the vehicle continues to move during the power failure, as for example if it is rolling down hill, the pump is driven via the drive train and insures that the operator can remain in control of the vehicle until it can be brought to a stop.

In summary, the invention provides a simple and effective means of removing a pump from a hydraulic control system. The pump eliminates the need for a mechanical clutch and can be connected to the hydraulic control circuit on a failsafe basis. Since the pump is required to do no work when it is out of operation power loss is nominal.

We claim:

1. In equipment having a variable speed motive power means for operation of a first mechanism throughout a range of speeds and a second mechanism which is fluid operated; a pump driven by said motive power means at all times when said power means is in operation, said pump having supply and discharge passages for delivering operating fluid from a fluid reservoir to said second mechanism; a control system for said pump comprising first valve means in the supply passage for said pump for interrupting the flow of operating fluid to said pump, second valve means in the discharge passage of said pump and operable to prevent the return of fluid to the pump and a control means for selectively operating said first valve means.

2. Equipment according to claim 1 wherein said pump is a gear pump.

3. Equipment according to claim 2 wherein said control system further includes selectively operable pilot valve means for operating said first valve means, said pilot valve means including a fluid inlet communicating with the pump discharge, an operating device for said first valve means and a means establishing a fluid communication between the pilot valve means and the operating device for opening said first valve means when the pilot valve is in one position and for closing the first valve means when the pilot valve means is in a second position.

4. Apparatus according to claim 3 including operator controlled means for operating said pilot valve.

5. Apparatus according to claim 3 further including means for biasing said first named valve means to the open position.

6. Apparatus according to claim 3 wherein said first named valve means comprises a plug valve, means mounting the plug valve for movement between an inlet opening position and an inlet closing position, means biasing the plug valve to the inlet opening position, means for mounting said shaft for movement towards and away from the inlet, wherein said operating device includes a hydraulically actuated piston for moving said plug valve mounting means and a first passage communicating with said pilot valve for admitting fluid under pressure to said piston in a sense to effect movement of the mounting means in a direction which closes said inlet, and means operable when the pilot valve is moved to a second position for directing fluid under pressure to the other side of said piston whereby the mounting means is moved to inlet opening position.

7. Apparatus according to claim 2 including a flow control means at the outlet of said pump for diverting fluid discharged from the pump in excess of a predetermined flow at times when the flow of fluid to the pump is not interrupted.

8. Fluid operated apparatus for use in a reversibly operable vehicle having motive power means for driving the vehicle from place to place and further having a fluid operated control system with a source of operating fluid for operating equipment on said vehicle, said apparatus comprising a hydraulic pump adapted to be driven when the vehicle is in motion, said pump having inlet and outlet passages for delivery of operating fluid from a reservoir to said fluid operated equipment, a control system for said pump for interrupting the flow of operating fluid to said pump including first valve means for delivery of fluid to the pump inlet passage, second valve means in the discharge passage of the pump for preventing return of fluid to the pump and control means for the first valve means, said control means being operable to close the first valve means when the pump is not required to supply operating fluid to the fluid operated control system and for opening the first valve means when the pump is required to supply operating fluid to the fluid operated control system.

9. Equipment according to claim 8 further including a second pump driven by said motive power means for delivery of operating fluid to said equipment and wherein said control means includes pressure operated means responsive to operation of said second pump for opening said first valve means in the absence of the delivery of fluid under pressure by said second pump.

10. In a vehicle having a source of motive power and auxiliary equipment adapted to be fluid power operated a fluid delivery system for the auxiliary equipment including a gear pump having inlet and outlet passages for transmitting operating fluid from a reservoir to said auxiliary equipment, drive means interconnecting the pump with the motive power means whereby the pump is in operation when the motive power is in operation and valve means in the fluid delivery system operable to interrupt the flow of fluid to the pump whereby the pump will run in a starved condition when the auxiliary equipment is out of operation.

* * * * *

UNITED STATES PATENT AND TRADEMARK OFFICE
CERTIFICATE OF CORRECTION

PATENT NO. : 3,935,917
DATED : February 3, 1976
INVENTOR(S) : James M. Eley et al It is certified that error appears in the above-identified patent and that said Letters Patent are hereby corrected as shown below:

Column 2, line 28, cancel "gear".

Column 2, line 31, insert --the condition in-- after "in".

Column 3, line 25, delete the word "auxiliary".

Column 3, line 27, insert --,-- after "36".

Column 5, line 26, change "65b" second occurrence to --69.

Column 6, line 6, cancel "entire".

Column 6, line 16, "failsafe" should be --fail-safe--.

Signed and Sealed this

Seventh Day of December 1976

[SEAL]

Attest:

RUTH C. MASON
*Attesting Officer*

C. MARSHALL DANN
*Commissioner of Patents and Trademarks*

REEXAMINATION CERTIFICATE (697th)
United States Patent [19]

Eley et al.

[11] B1 3,935,917

[45] Certificate Issued Jun. 9, 1987

[54] HYDRAULIC PUMP CONTROL SYSTEM

[75] Inventors: James M. Eley; Arthur B. Joyce, both of Corinth, Miss.

[73] Assignee: Tyrone Hydraulics, Inc., Corinth, Miss.

Reexamination Request:
No. 90/000,551, May 7, 1984

Reexamination Certificate for:
Patent No.: 3,935,917
Issued: Feb. 3, 1976
Appl. No.: 515,990
Filed: Oct. 18, 1974

Certificate of Correction issued Dec. 7, 1976.

[51] Int. Cl.⁴ .............................................. B62D 5/08
[52] U.S. Cl. .................................. 180/53.4; 180/133; 60/405
[58] Field of Search ...................... 180/53.4, 133, 163; 417/295, 253; 60/404, 405

[56] References Cited

U.S. PATENT DOCUMENTS

| | | |
|---|---|---|
| 822,276 | 6/1906 | Hodsdon . |
| 1,307,602 | 6/1919 | Schirmer . |
| 1,345,902 | 7/1920 | Vincent . |
| 1,663,647 | 3/1928 | Brush . |
| 2,107,760 | 2/1938 | McCormick et al. . |
| 2,118,180 | 5/1938 | Ferguson . |
| 2,162,486 | 6/1939 | Le Tourneau . |
| 2,251,664 | 8/1941 | Davis .................................. 60/52 |
| 2,267,448 | 12/1941 | Dooley . |
| 2,272,415 | 1/1942 | Conlon .................................. 62/3 |
| 2,276,207 | 3/1942 | Klein . |
| 2,370,526 | 2/1945 | Doran . |
| 2,387,531 | 10/1945 | Rose . |
| 2,433,220 | 12/1947 | Huber . |
| 2,433,222 | 12/1947 | Huber . |
| 2,464,448 | 3/1949 | Huber . |
| 2,465,484 | 3/1949 | Robinson . |
| 2,590,622 | 3/1952 | Huber . |
| 2,620,738 | 12/1952 | Huber . |
| 2,642,804 | 6/1953 | Bowers . |
| 2,664,048 | 12/1953 | Huber . |
| 2,778,314 | 1/1957 | Siver . |
| 2,867,976 | 1/1959 | Huber . |
| 2,918,085 | 12/1959 | Govan et al. ........................ 137/557 |
| 2,918,879 | 12/1959 | Cervo . |
| 2,928,376 | 3/1960 | Levetus . |
| 2,965,040 | 12/1960 | Eisenberg . |
| 2,965,119 | 12/1960 | Hawkinson et al. . |
| 3,016,018 | 11/1962 | Williams . |
| 3,043,107 | 7/1962 | Magnus, Jr. . |
| 3,065,810 | 11/1962 | Chambers et al. . |
| 3,135,210 | 6/1964 | English . |
| 3,280,557 | 10/1966 | Sattavara . |
| 3,407,894 | 10/1968 | Thompson . |
| 3,424,262 | 1/1969 | Kunz . |
| 3,434,282 | 3/1969 | Shelhart . |
| 3,449,911 | 6/1969 | Schlosser . |
| 3,482,768 | 12/1969 | Cirrincione et al. . |
| 3,631,937 | 1/1972 | Joyce .................................. 60/405 |
| 3,696,613 | 10/1972 | Goodale . |
| 3,744,374 | 7/1973 | Schneider et al. .................... 91/363 |
| 3,747,725 | 7/1973 | Feustel et al. . |
| 3,776,431 | 12/1973 | Riley .................................. 60/431 |
| 3,800,900 | 4/1974 | Goodale . |
| 3,849,985 | 11/1974 | Ratliff et al. . |

FOREIGN PATENT DOCUMENTS

| | | |
|---|---|---|
| 336303 | 10/1933 | Canada . |
| 377074 | 10/1938 | Canada . |
| 529652 | 8/1956 | Canada . |
| 622244 | 6/1961 | Canada . |
| 1199135 | 8/1965 | Fed. Rep. of Germany . |
| 1528949 | 11/1969 | Fed. Rep. of Germany . |
| 2363480 | 6/1975 | Fed. Rep. of Germany . |
| 2127990 | 9/1972 | France . |
| 3714025 | of 1962 | Japan . |
| 4836015 | of 1973 | Japan . |
| 969189 | 9/1964 | United Kingdom . |
| 1232757 | 5/1971 | United Kingdom . |
| 1257728 | 12/1971 | United Kingdom . |
| 1259167 | 1/1972 | United Kingdom . |
| 1383569 | 2/1975 | United Kingdom . |

OTHER PUBLICATIONS

Brochure, "Diagnosing Tyrone Gear Pump Failures", published by Dana Corporation in 1973.
Brochure, "STRATOPOWER Aircraft Hydraulics", published by New York Air Brake Co. in 1957.
"Fluid Power Handbook" 1962/63, pp. A/150–151, 210–211, by the Industrial Pub. Corp.
Translation of German Office Action dated 6/6/84.
John Deere "Open–Loop Hydraulic Pumps" brochure (date unknown).
Sundstrand Service Manual for Heavy Duty Transmissions, Bulletin 9630, May, 1973, Rev. A.
"Reservoir Design as Viewed by a Pump Manufacturer", James M. Eley, Sep. 14–17, 1970.
"Reservoir Design for Mobile Equipment Hydraulic Circuits", Edward A. Wirtz, Sep. 14–17, 1970.
*Fluid Power Handbook and Directory,* Horsepower Requirements of Utility Truck Hydraulic Systems, Fluid Power and Control Systems.

*Primary Examiner*—Robert J. Spar

[57] ABSTRACT

The disclosure relates to a control system for hydraulic pumps driven by the engine of a vehicle or the like and used for operating an auxiliary mechanism such as a vehicle mounted implement, a power steering system or the like. The disclosed system includes means for interrupting the flow of operating fluid to the pump during periods of time when the output of the pump is not required. With the pump inlet closed, all of the hydraulic fluid on the suction side is immediately pumped out the pump discharge, leaving only a small amount of residual oil on the surface of the working parts to provide lubrication. A valve is provided to prevent fluid from returning to the pump because of downstream pressure in the circuit. Control means, utilizing pressure downstream from the pump, for operating the valve in the inlet of the pump are disclosed.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 10 is confirmed.

Claim 2 is cancelled.

Claims 1, 3, 7 and 8 are determined to be patentable as amended.

Claims 4–6 and 9, dependent on an amended claim, are determined to be patentable.

New claims 11–18 are added and determined to be patentable.

1. In equipment having a variable speed motive power means for operation of a first mechanism throughout a range of speeds and a second mechanism which is fluid operated; a *gear* pump driven by said motive power means at all times when said power means is in operation, said pump having supply and discharge passages for delivering operating fluid from a fluid reservoir to said second mechanism; a control system for said pump comprising first valve means in the supply passage for said pump for interrupting the flow of operating fluid to said pump, second valve means in the discharge passage of said pump and operable to prevent the return of fluid to the pump and a control means for selectively operating said first valve means.

3. Equipment according to claim [2] *1* wherein said control system further includes selectively operable pilot valve means for operating said first valve means, said pilot valve means including a fluid inlet communicating with the pump discharge, an operating device for said first valve means and a means establishing a fluid communication between the pilot valve means and the operating device for opening said first valve means when the pilot valve is in one position and for closing the first valve means when the pilot valve means is in a second position.

7. Apparatus according to claim [2] *1* including a flow control means at the outlet of said pump for diverting fluid discharged from the pump in excess of a predetermined flow at times when the flow of fluid to the pump is not interrupted.

8. Fluid operated apparatus for use in a reversibly operable vehicle having motive power means for driving the vehicle from place to place and further having a fluid operated control system with a source of operating fluid for operating equipment on said vehicle, said apparatus comprising a hydraulic *gear* pump adapted to be driven when the vehicle is in motion, *said pump being reversed in direction when the vehicle direction is reversed and* said pump having inlet and outlet passages for delivery of operating fluid from a reservoir to said fluid operated equipment, a control system for said pump for interrupting the flow of operating fluid to said pump including first valve means for delivery of fluid to the pump inlet passage, second valve means in the discharge passage of the pump for preventing return of fluid to the pump and control means for the first valve means, said control means being operable to close the first valve means when the pump is not required to supply operating fluid to the fluid operated control system and for opening the first valve means when the pump is required to supply operating fluid to the fluid operated control system.

*11. Apparatus according to claim 10 including a flow control means at the outlet of said gear pump for diverting fluid discharged from the pump in excess of a predetermined flow at times when the flow of fluid to the pump is not interrupted.*

*12. Apparatus according to claim 10 including means in the fluid delivery system on the outlet side of said pump for connecting said outlet passage to said reservoir when said auxiliary equipment is out of operation.*

*13. Apparatus according to claim 12 wherein said means for connecting is an open-center valve.*

*14. Apparatus according to claim 10 wherein said valve means is a plug valve comprising a plug mounted on a shaft for movement between an inlet opening position and an inlet closing position, means biasing the plug toward said inlet opening position, and control means for operating said shaft in the direction of said inlet closing position.*

*15. Apparatus according to claim 12 wherein said valve is a plug valve comprising a plug mounted on a shaft for movement between an inlet opening position and an inlet closing position, means biasing the plug toward said inlet opening position and fluid-operated control means for moving said shaft in the direction of said inlet closing position.*

*16. Apparatus according to claim 12 wherein said connecting means transmits operating fluid from said pump outlet passage to said reservoir whereby no standby operating pressure is maintained in said fluid delivery system for said auxiliary equipment.*

*17. Apparatus according to claim 13 wherein said connecting means transmits operating fluid from said pump outlet passage to said reservoir whereby no standby operating pressure is maintained in said fluid delivery system for said auxiliary equipment.*

*18. Apparatus according to claim 15 wherein said connecting means transmits operating fluid from said pump outlet passage to said reservoir whereby no standby operating pressure is maintained in said fluid delivery system for said auxiliary equipment.*

* * * * *